United States Patent
Huang (10) Patent No.: US 9,430,394 B2
(45) Date of Patent: Aug. 30, 2016

(54) STORAGE SYSTEM HAVING DATA STORAGE LINES WITH DIFFERENT DATA STORAGE LINE SIZES

(71) Applicant: MediaTek Singapore Pte. Ltd., Singapore (SG)

(72) Inventor: Hsilin Huang, Cupertino, CA (US)

(73) Assignee: MediaTek Singapore Pte. Ltd., Singapore (SG)

( * ) Notice: Subject to any disclaimer, the term of this patent is extended or adjusted under 35 U.S.C. 154(b) by 266 days.

(21) Appl. No.: 14/103,865

(22) Filed: Dec. 12, 2013

(65) Prior Publication Data

US 2015/0169459 A1 Jun. 18, 2015

(51) Int. Cl.
*G06F 12/08* (2016.01)

(52) U.S. Cl.
CPC ....... *G06F 12/0864* (2013.01); *G06F 12/0886* (2013.01); *G06F 2212/455* (2013.01); *G06F 2212/601* (2013.01); *G06F 2212/6032* (2013.04)

(58) Field of Classification Search
None
See application file for complete search history.

(56) References Cited

U.S. PATENT DOCUMENTS

| | | | |
|---|---|---|---|
| 6,748,492 B1* | 6/2004 | Dickman | G06F 12/126 711/128 |
| 6,825,848 B1* | 11/2004 | Fu | G06T 1/60 345/557 |
| 7,206,889 B2 | 4/2007 | Shaw | |
| 7,356,650 B1* | 4/2008 | Englin | G06F 12/0811 711/134 |
| 8,185,693 B2* | 5/2012 | Toub | 711/119 |
| 2002/0188805 A1* | 12/2002 | Kottapalli | G06F 12/0897 711/119 |
| 2003/0001857 A1* | 1/2003 | Doyle | G06T 15/04 345/582 |
| 2008/0256303 A1 | 10/2008 | Croxford | |
| 2008/0292276 A1* | 11/2008 | Horvath | G06F 12/0875 386/353 |
| 2009/0128575 A1* | 5/2009 | Liao | G06T 15/04 345/552 |
| 2009/0189909 A1* | 7/2009 | Jiao | G06T 1/60 345/506 |
| 2010/0106910 A1* | 4/2010 | Miwa | G06F 12/0855 711/118 |
| 2012/0265943 A1 | 10/2012 | Koob | |

FOREIGN PATENT DOCUMENTS

WO 2012109770 A1 8/2012

OTHER PUBLICATIONS

Rothman, Sector Cache Design and Performance, Report No. UCB/CSD-99-1034, Computer Science Division (EECS), University of California, Berkeley, California 94720, Jan. 1999.

* cited by examiner

*Primary Examiner* — Yong Choe
*Assistant Examiner* — Edward Waddy, Jr.
(74) *Attorney, Agent, or Firm* — Winston Hsu; Scott Margo (57) ABSTRACT

A storage system includes a data storage device having a plurality of data storage lines, a tag storage device having a plurality of address tags each associated with one data storage line allocated in the data storage device, and a controller. The controller sets a first number of address tags and configures a first number of data storage lines to serve as a first data storage line with a first data storage line size, and sets a second number of address tags and configures a second number of data storage lines to serve as a second data storage line with a second data storage line size. The second data storage line size is different from the first data storage line size.

16 Claims, 6 Drawing Sheets

STORAGE SYSTEM HAVING DATA STORAGE LINES WITH DIFFERENT DATA STORAGE LINE SIZES

BACKGROUND

The disclosed embodiments of the present invention relate to accessing buffered data (e.g., cached data), and more particularly, to a storage system having data storage lines (e.g., cache lines) with different data storage line sizes (e.g., different cache line sizes).

Cache memories are high speed buffers used to temporarily hold, for repeated access, portions of the contents of a larger and slower memory such as a main memory. Most modern caches are organized as a set of entries. Each entry consists of a block (or line) of data, and an address tag; the address tag is associated with the location of the data in the larger main memory. The cache is accessed associatively—the key to the cache is not the location in the cache but the location in the main memory. To accelerate access, of course, the cache may not be fully associative, but rather may be set associative, direct mapped or hashed. Most of caches include cache lines each having a fixed cache line size. In a slightly more complex design, a sector cache is used. A sector cache is organized as a set of sectors, and there is an address tag associated with each sector. The sector itself is divided into subsectors. Each subsector has a valid bit, and thus only some of the subsectors of a sector need to be present. When there is a cache miss to a sector, a resident sector is evicted, an address tag is set to the address of the new sector, and a single subsector is fetched. When there is a cache miss to a subsector, but the sector containing it is already present in the cache, only that needed subsector is fetched.

The original reason for the sector cache is that the discrete transistor logic of the time makes a sector design easier to build than the currently more common non-sectored design with the unit of data transfer and addressing as either a "block" or a "line". In a normal, non-sectored cache, the only way to have a very large cache capacity with a relatively small number of tag bits is to make the cache blocks (lines) very large. However, the problem in this case is that every cache miss requires a large block be fetched in its entirety. With a sector cache, it is possible to fetch only a portion of a block (or sector), and thus the time to handle a cache miss, and the bus traffic, can both be significantly reduced. Thus, although it is likely that sector caches will have higher cache miss ratios than normal caches, there is the possibility that when timing is considered, the sector cache will be found to have better performance. However, the problem with the sector design is that a sector would typically be evicted from the cache before all of its subsectors are loaded with data, and thus a large fraction of the cache capacity would be unused. Specifically, sector caches have the feature that large numbers of bytes can be tagged using relatively small numbers of tag bits, while still only transferring small blocks when a miss occurs. However, one tag would correspond to a large numbers of bytes. When the cache line is replaced very often, the rest of bytes might still be empty. It may consume precious space of the cache memory.

SUMMARY

In accordance with exemplary embodiments of the present invention, a storage system having data storage lines (e.g., cache lines) with different data storage line sizes (e.g., different cache line sizes) is proposed.

According to a first aspect of the present invention, an exemplary storage system is disclosed. The exemplary storage system includes: a data storage device, having a plurality of data storage lines; a tag storage device, having a plurality of address tags, each associated with one data storage line allocated in the data storage device; and a controller, coupled between the data storage device and the tag storage device. The controller is arranged to set a first number of address tags and configure a first number of data storage lines to serve as a first data storage line with a first data storage line size, and set a second number of address tags and configure a second number of data storage lines to serve as a second data storage line with a second data storage line size, wherein the second data storage line size is different from the first data storage line size.

According to a second aspect of the present invention, an exemplary storage system is disclosed. The exemplary storage system includes: a data storage device; a tag storage device; and a controller, coupled between the data storage device and the tag storage device. The controller is arranged to set the tag storage device and configure the data storage device to allocate a first data storage line with a first data storage line size for storing a render target (RT) texture, and set the tag storage device and configure the data storage device to allocate a second data storage line with a second data storage line size for storing a non-RT texture. The second data storage line size is different from the first data storage line size.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the description and following claims to refer to particular components. As one skilled in the art will appreciate, manufacturers may refer to a component by different names. This document does not intend to distinguish between components that differ in name but not function. In the following description and in the claims, the terms "include" and "comprise" are used in an open-ended fashion, and thus should be interpreted to mean "include, but not limited to . . . ". Also, the term "couple" is intended to mean either an indirect or direct electrical connection. Accordingly, if one device is coupled to another device, that connection may be through a direct electrical connection, or through an indirect electrical connection via other devices and connections.

The concept of the present invention is to use a cache memory with a mixed cache line size (i.e., a cache memory having cache lines with different cache line sizes), which can efficiently use the precious space of the cache memory, reduce the cache miss rate, and improve the memory efficiency of a main memory such as a dynamic random access memory (DRAM). Further details are described as below.

Figure 1:
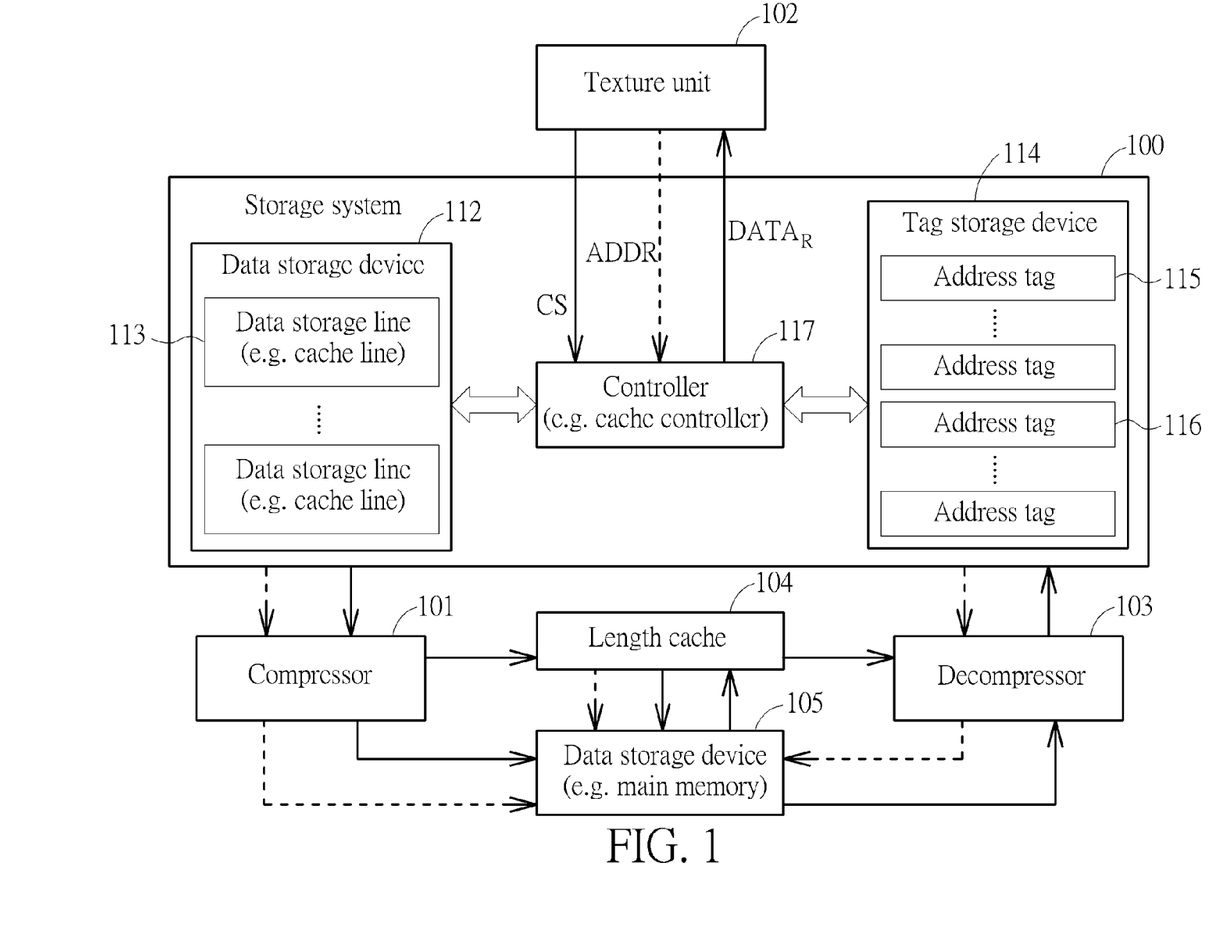
FIG. 1 is a diagram illustrating a storage system according to an embodiment of the present invention.

Please refer to FIG. 1, which is a diagram illustrating a storage system according to an embodiment of the present invention. The storage system 100 may be a cache memory (e.g., a memory device with a faster data access speed) implemented in any application requiring faster information transaction between a processor and a storage device (e.g., a memory device with a slower data access speed). In this embodiment, the storage system 100 serves as a cache memory of a graphics system. Hence, besides the storage system 100, the graphics system includes a compressor 101, a texture unit 102, a decompressor 103, a length cache 104, and a data storage device (e.g., a main memory) 105 external to the storage system 100. The storage system 100 includes a data storage device 112, a tag storage device 114 and a controller 117. The data storage device 112 includes a plurality of data storage lines 113. For example, the data storage device 112 is implemented using a static random access memory (SRAM) used for storing cached data, and each of the data storage lines 113 is a cache line with a basic/default cache line size (e.g., 512 bits). The tag storage device 114 may be a tag RAM having a plurality of first address tags 115 and a plurality of second address tags 116 stored therein. It should be noted that, besides an address tag, each tag entry may include additional control information such as a valid bit, a dirty bit, etc. Specifically, the first address tags 115 may be odd address tags (i.e., odd tags), and the second address tags 116 may be even address tags (i.e., even tags), where one odd tag and one even tag form one pair of adjacent address tags in the tag storage device 114. The data storage device 112 and the tag storage device 114 may be allocated in different storage spaces of the same memory. Alternatively, the data storage device 112 and the tag storage device 114 may be allocated in distinct memories.

For clarity and simplicity, a cache memory is used as an example of the storage system 100 to describe technical features of the present invention. Hence, in the following, "data storage line" and "cache line" are interchangeable, and "storage system" and "cache system" are interchangeable. However, the proposed adaptive cache line size design is not limited to a cache application only. Any data storage/buffer using the proposed design concept falls within the scope of the present invention.

In this embodiment, each of first address tags 115 and second address tags 116 is associated with one of the cache lines 113 allocated in the data storage device 112, and is used to store a portion of an address corresponding to data stored in a cache line 113 associated with this address tag.

The controller 117 is coupled between the data storage device 112 and the tag storage device 114, and is arranged to control the operation of the storage system 100. For example, the controller 117 may be a cache controller which snoops the bus activities of a processor (e.g., texture unit 102 in this embodiment), and determines if an address ADDR for a requested data $DATA_R$ causes a cache hit or a cache miss. For clarity, a data transmission path is illustrated using a solid line, and an address transmission path is illustrated using a dashed line. When a cache hit is identified by the controller 117, the controller 117 fetches the requested data $DATA_R$ from one cache line 113 and returns the requested data $DATA_R$ to the texture unit 102. When a cache miss is identified by the controller 117, the controller 117 follows a replacement rule to update one or more cache lines 113 and associated address tag(s), and returns the requested data $DATA_R$ fetched from the data storage device 105 to the texture unit 102. Further detail directed to dealing with a cache miss event based on the data type of the requested data $DATA_R$ is described later with reference to the accompanying drawings.

In a graphics processing unit (GPU), many schemes may be employed to reduce memory bandwidth. One of the schemes is using a compression unit to compress the data before it is stored into the memory, thereby reducing the memory bandwidth. If a big chunk of data is compressed, the compression rate will be better than that of compressing a small chunk of data. However, the compressed data read from the memory should be the whole chunk of data. Otherwise, the decompression unit cannot understand it due to lack of enough information for data decompression. In this embodiment, the compressor 101 is disposed between the texture unit 102 and the data storage device 105, and arranged to compress a render target (RT) texture to generate an RT compressed texture; and the decompressor 103 is disposed between the texture unit 102 and the data storage device 105, and arranged to decompress the RT compressed texture read from the data storage device 105 to reconstruct the RT texture. It should be noted that a standardized non-RT texture is not processed by the compressor 101. Hence, the texture data stored in the data storage device 105 may include RT compressed texture data and non-RT-compressed texture data.

By way of example, but not limitation, the cache system 100 may be bypassed when the texture unit 102 stores the RT texture data into the data storage device 105 through the compressor 101, and the cache system 100 may be used to cache the RT texture data obtained through the data storage device 105 and the decompressor 103. Further, the cache system 100 and the compressor 101 may be bypassed when the texture unit 102 stores the non-RT texture data into the data storage device 105, and the decompressor 103 maybe bypassed when the texture unit 102 reads the non-RT texture data from the data storage device 105 through the cache system 100.

In a preferred embodiment, the compressor 101 is arranged to use 1K bits as a compression data chunk for achieving a better compression rate and a higher memory efficiency. If the compressor 101 is configured to use 512 bits as a compression data chunk, the compression rate will be 10% less. Let's say if the compressor uses 512 bits as the original data, the compressor compresses the 512 bits into 256 bits if it is assumed the compression rate is 50%. Please refer to FIG. 2, which is a diagram illustrating the relationship between the memory efficiency of the main memory (i.e., the percentage of memory cycles used for actually accessing data of the main memory) and the requested data size. When we write data as 512 bits (64 bytes), the memory utilization is 92%. However, the utilization rate is not very good when we write data as 256 bits (32 bytes). As can be seen from FIG. 2, the memory utilization is dropped to 54%. Even the compression rate is 50%, we only gain little on the memory cycles. However, when we write data as 1K bits (128 bytes), the memory utilization is 95%. If the compressor compresses from 1K bits (128 bytes), and the compression rate is 60%. The utilization rate of the main memory is slightly dropped from 95% (128 bytes) to 92% (64 bytes). We still gain more than 50% of total memory cycles.

Based on above observation, the compressor 101 of the present invention uses 1K bits (128 bytes) as a compression data chunk for compressing an RT texture to be stored into the data storage device 105, and then stores the RT compressed texture into the data storage device 105. For example, a lightweight temporal compression (LTC) algorithm may be employed by the compressor 101. Compared to the compression design using a smaller compression unit size, the proposed design of using a larger compression unit size (e.g., 1K bits or 128 bytes) can make the data storage device (e.g., a main memory) 105 have improved memory efficiency.

Because the length of the compression data chunk is 1K bits in the preferred embodiment, the data storage device 105 therefore has a 1K-bit storage space allocated for storing the compressed data generated from compressing one 1K-bit raw data. More specifically, considering a case where the texture unit 102 wants to store a 1K-bit RT texture into a 1K-bit storage space in the data storage device 105, the compressor 101 between the texture unit 102 and the data storage device 105 generates an M-bit RT compressed texture (M<1K) and stores the M-bit RT compressed texture into the 1K-bit storage space originally designated for buffering the 1K-bit RT texture. As a result, the texture unit 102 still regards that the 1K-bit RT texture is stored into the 1K-bit storage space in the data storage device 105, and therefore issues memory addresses corresponding to data belonging to the 1K-bit RT texture to retrieve the requested data from the data storage device 105. However, the actual data stored in the 1K-bit storage space defined by the memory address of the 1K-bit RT texture is the M-bit RT compressed texture rather than the 1K-bit RT texture.

Figure 3:
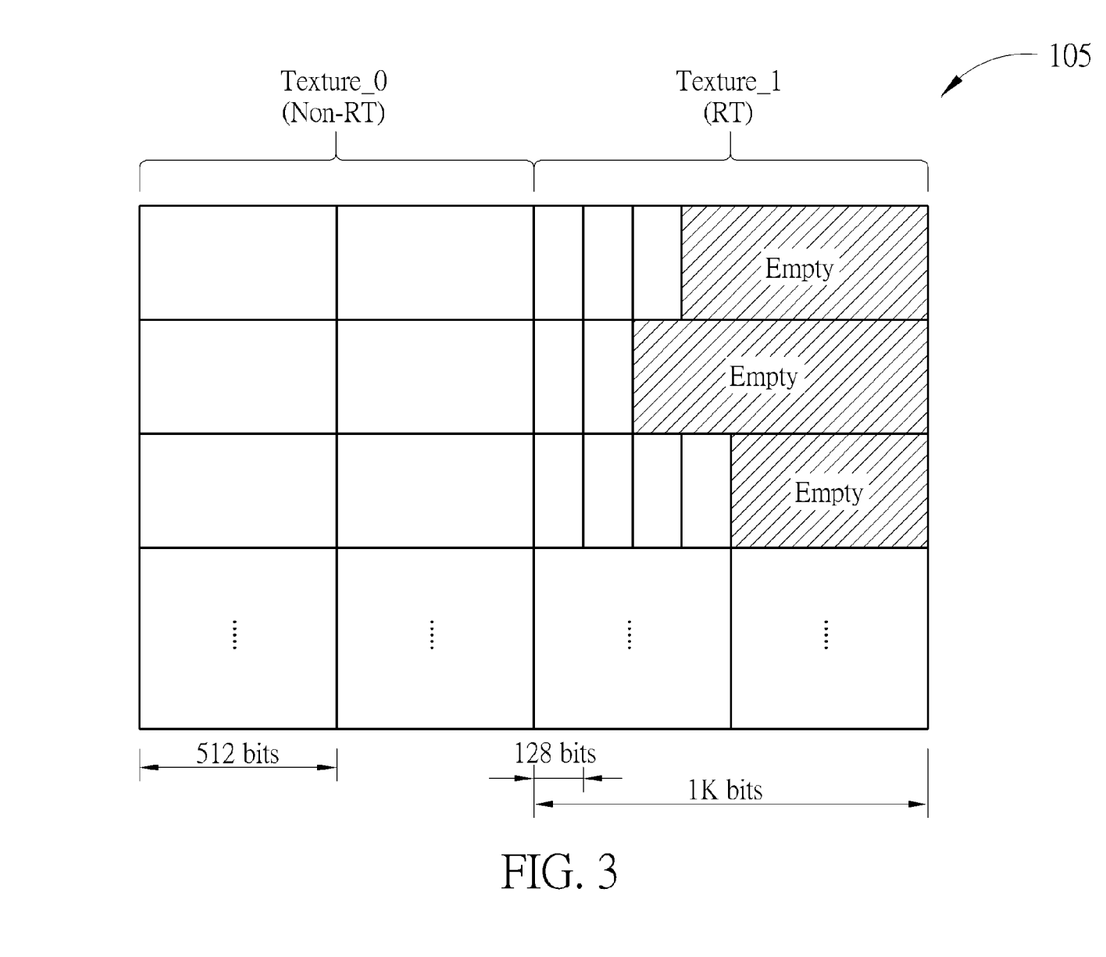
FIG. 3 is a diagram illustrating a memory arrangement of the data storage device shown in FIG. 1 according to an embodiment of the present invention.

Please refer to FIG. 3, which is a diagram illustrating a memory arrangement of the data storage device 105 shown in FIG. 1 according to an embodiment of the present invention. The data storage device 105 may be configured to have a first storage space Texture_0 and a second storage space Texture_1, where the first storage space Texture_0 is dedicated to buffering the non-RT-compressed texture (i.e., raw non-RT texture data), and the second storage space Texture_1 is dedicated to buffering the RT compressed texture (i.e., compressed data of the RT texture). When the compressed data is generated from compressing one 1K-bit raw RT texture data, the compression rate is higher than 50%. Hence, in the 1K-bit storage space originally allocated for storing the 1K-bit raw RT texture data, there would be an empty area (i.e., a portion of the allocated storage space that has no data stored therein). By way of example, the compressed data may be generated in the unit of 128 bits. As shown in FIG. 3, the first 1K-bit storage space stores an RT compressed data composed of three 128-bit compressed data chucks only; the second 1K-bit storage space stores another RT compressed data composed of two 128-bit compressed data chucks only; and the third 1K-bit storage space stores yet another RT compressed data composed of four 128-bit compressed data chucks only. For each 1K-bit raw RT texture data, the compressor 101 knows the compressed data length (i.e., 128-bit×N) after compression is done. In other words, after applying data compression to the 1K-bit raw RT texture data, the compressor 101 knows how many 128-bit compressed data chucks are stored into the 1K-bit storage space originally allocated for buffering the 1K-bit raw RT texture data. This length information may be referenced by the decompressor 103 for retrieving all of the compressed data from the 1K-bit storage space without wasting memory cycles on accessing the empty area.

With regard to the non-RT-compressed texture (i.e., the standardized non-RT texture), it is stored into the data storage device 105 in the unit of 512 bits (i.e., the basic cache line size of the present invention). That is, the non-RT-compressed texture (i.e., the standardized non-RT texture) is partitioned into 512-bit data chunks, and then stored into the first storage space Texture_0 without undergoing any data compression.

As mentioned above, the compressed data read from the memory should be the whole chunk of data, otherwise the decompression unit cannot understand it. For example, when the texture unit 102 requests a 512-bit RT texture data, the decompressor 103 is unable to reconstruct the requested 512-bit RT texture data by merely reading an RT compressed data of the 512-bit RT texture data from the data storage device 105 due to the fact that the compressor 101 uses 1K bits (128 bytes) as a compression data chunk. Besides, since the compressor 101 uses 1K bits (128 bytes) as a compression data chunk, the decompressor 103 may not know the exact location of a partial RT compressed data in the data storage device 105. In other words, the decompressor 103 is required to use the whole RT compressed data of the 1K-bit RT texture data as a decompression data chunk. Since the non-RT-compressed texture and the RT compressed texture are stored into the data storage device 105 based on different storage space sizes (e.g., 512 bits and 1K bits), the data storage device 112 of the storage system 100 is configured to have different data storage line sizes (cache line sizes) for buffering 512-bit texture data and 1K-bit texture data.

In this embodiment, the controller 117 is arranged to set a first number of address tags 115, 116 and configure a first number of data storage lines 113 to serve as a first data storage line with a first data storage line size, and set a second number of address tags 115, 116 and configure a second number of data storage lines 113 to serve as a second data storage line with a second data storage line size, wherein the second data storage line size is different from the first data storage line size. Supposing that each data storage line 113 is a cache line with a basic cache line size of 512 bits and the compressor 101 uses 1K bits (128 bytes) as a compression data chunk, the first number may be equal to one, and the second number may be equal to two. Hence, when the requested data is an RT texture (e.g., an RT compressed texture stored in the data storage device 105), two 512-bit cache lines are combined to serve as one 1K-bit cache line; and when the requested data is a non-RT texture (e.g., non-RT-compressed texture stored in the data storage device 105), one 512-bit cache line is used directly. As the requested texture data may be derived from an RT compressed texture in the data storage device 105 or a non-RT-compressed texture in the data storage device 105, the first data storage lines, each having a first data storage line size (e.g., 512 bits), and the second data storage lines, each having a second data storage line size (e.g., 1K bits), may coexist in the storage system 100 for buffering the non-RT texture data read from the data storage device 105 and the RT texture data reconstructed by the decompressor 103, respectively.

More specifically, since the requested texture data, either an RT texture or a non-RT texture, is dynamically needed by the texture unit 102, the controller 117 controls the data storage device 112 and the tag storage device 114 to dynamically set a data storage line size (cache line size). To put it simply, the controller 117 is arranged to set the tag storage device 114 and configure the data storage device 112 to allocate a first cache line with a first cache line size for storing an RT texture, and set the tag storage device 114 and configure the data storage device 112 to allocate a second cache line with a second cache line size for storing a non-RT texture, wherein the second cache line size (e.g., 512 bits) is different from the first cache line size (e.g., 1K bits).

Figure 4:
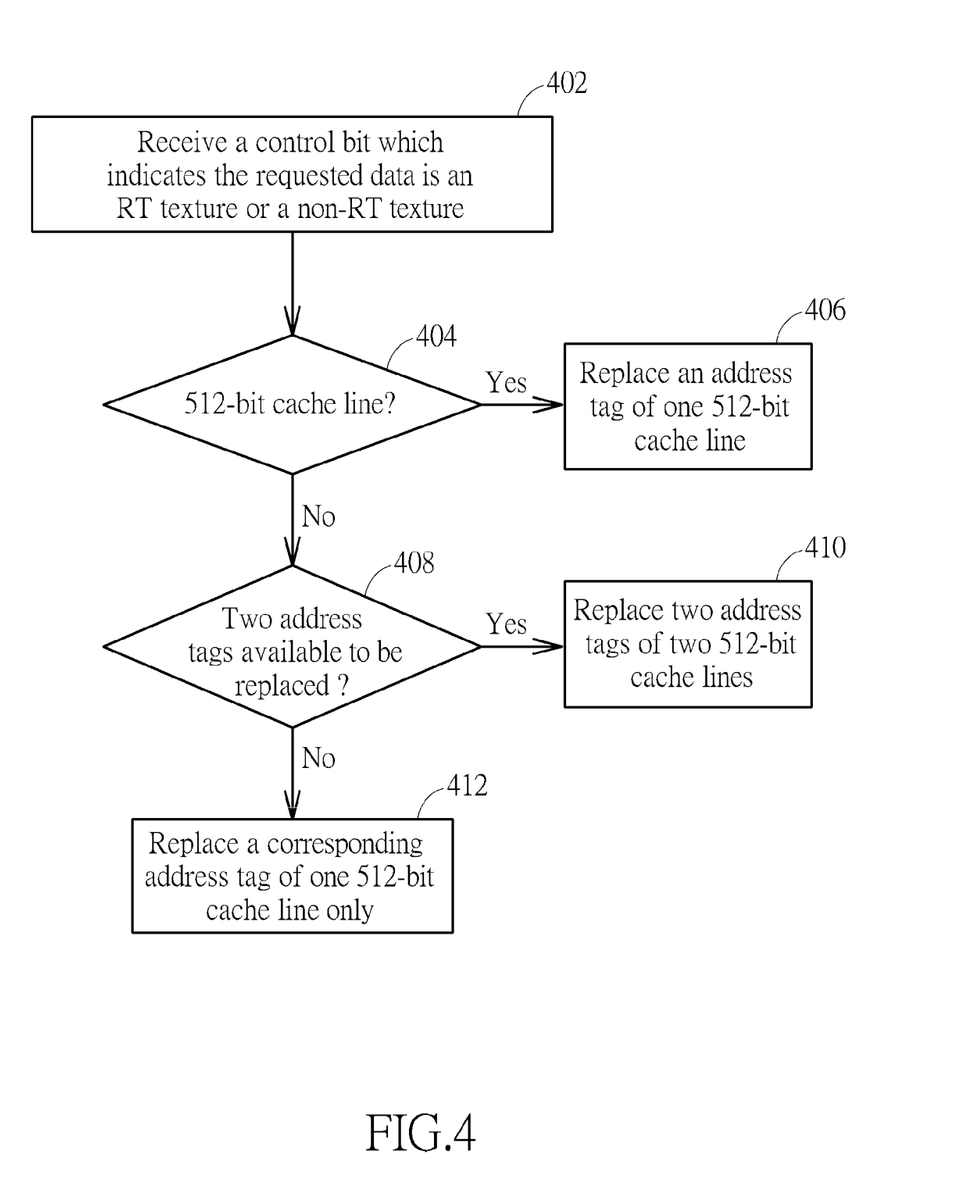
FIG. 4 is a flowchart illustrating a dynamic allocation for different cache line sizes according to an embodiment of the present invention.

Please refer to FIG. 4, which is a flowchart illustrating a dynamic allocation for different cache line sizes according to an embodiment of the present invention. Provided that the result is substantially the same, the steps are not required to be executed in the exact order shown in FIG. 4. The method for dynamically setting the cache line size may be employed by the storage system 100.

In step 402, the controller 117 receives a control bit CS generated from the texture unit 102. The texture unit 102 may issue an address ADDR to obtain a requested data $DATA_R$. In this embodiment, the basic cache line size employed by the data storage device 112 is 512 bits. Hence, the texture unit 102 may read one 512-bit texture data (i.e., $DATA_R$) in each data request by issuing a proper address ADDR. As the texture unit 102 knows whether the requested data $DATA_R$ is an RT texture or a non-RT texture, the texture unit 102 sets the control bit CS to inform the controller 117 of the texture type of the requested data $DATA_R$.

In step 404, the controller 117 refers to the control bit CS to determine whether a 512-bit cache line should be used. For example, when the control bit CS indicates that the requested data $DATA_R$ is a non-RT texture, a cache line size of 512 bits should be used. The flow proceeds with step 406. In step 406, when a cache miss occurs, the controller 117 employs a set/way associated scheme to replace one address tag of an associated 512-bit cache line such that a 512-bit data chunk of the non-RT-compressed texture stored in the data storage device 105 is fetched and stored into the associated 512-bit cache line. Next, the controller 117 fetches the requested data $DATA_R$ from the associated 512-bit cache line in the data storage device 112, and returns the requested data $DATA_R$ to the texture unit 102. Since a smaller cache line size is employed for buffering the non-RT texture, this efficiently uses the precious space of the cache memory when compared to the conventional sector cache design.

When the control bit CS indicates that the requested data $DATA_R$ is an RT texture, a cache line size of 1K bits should be used when a cache miss occurs. The flow therefore proceeds with step 408. In step 408, the controller 117 checks whether the tag storage device 114 has two address tags (e.g., two adjacent address tags) available to be replaced. As mentioned above, though the requested data $DATA_R$ is a 512-bit RT texture data, the decompressor 103 would generate a 1K-bit RT texture data. Thus, if the tag storage device 114 has two address tags (e.g., two adjacent address tags) available to be replaced, all of the 1K-bit RT texture data reconstructed by the decompressor 103 is allowed to be stored into associated storage space (e.g., two adjacent cache lines) in the data storage device 112, thereby reducing the cache miss rate. More specifically, when the texture unit 102 wants to read a second half of the 1K-bit RT texture data (i.e., the other 512-bit RT texture data) after obtaining a requested first half of the 1K-bit RT texture data (i.e., one 512-bit RT texture data), the requested data is directly available in the data storage device 112 due to the fact that the second half of the 1K-bit RT texture data is pre-loaded into the data storage device 112 in response to the previous data request of the first half of the 1K-bit RT texture data. Hence, when a checking result indicates that the tag storage device 114 has two address tags available to be replaced, the flow proceeds with step 410. In step 410, the controller 117 employs a set/way associated scheme to replace two address tags of associated 512-bit cache lines such that a 1K-bit data chunk of the RT texture obtained through the data storage device 105 and the decompressor 103 is stored into two 512-bit cache lines combined to serve as one 1K-bit cache line. Since the basic cache line size in this embodiment is 64 bytes (512 bits), the addressing bit Addr[6] of the address of an upper half (Bit[1023]-Bit[512]) of the 1K-bit data chunk is different from the addressing bit Addr[6] of the address of a lower half (Bit[511]-Bit[0]) of the same 1K-bit data chunk. Hence, two adjacent address tags of associated 512-bit cache lines combined to serve as one 1K-bit cache line maybe replaced with tag values different from each other by having different LSB bits. In this way, these two adjacent address tags would indicate which one of the associated 512-bit cache lines stores the upper half (Bit[1023]-Bit[512]) of the 1K-bit data chunk, and which one of the associated 512-bit cache lines stores the lower half (Bit[511]-Bit[0]) of the 1K-bit data chunk. Next, the controller 117 fetches the requested data $DATA_R$ (512 bits) from the associated 1K-bit cache line, and returns the requested data $DATA_R$ to the texture unit 102.

As mentioned above, the compressor 101 knows the compressed data length (i.e., 128-bit×N) after compression is done. The corresponding compressed data length is also stored into the length cache 104 by the compressor 101. Hence, the compressed data length would indicate how many 128-bit data chunks should be fetched from one 1K-bit storage space (which is found in the data storage device 105 based on the address ADDR) for obtaining the desired compressed data. The decompressor 103 refers to the compressed data length in the length cache 104 to only fetch the compressed data from the 1K-bit storage space as illustrated in FIG. 3, and then performs data decompression upon the compressed data to generate the 1K-bit data chunk of the RT texture. In other words, the decompressor 103 does not need to read all of the 1K-bit storage space addressed by the address ADDR since the 1K-bit storage space is not fully loaded with the compressed data.

Figure 2:
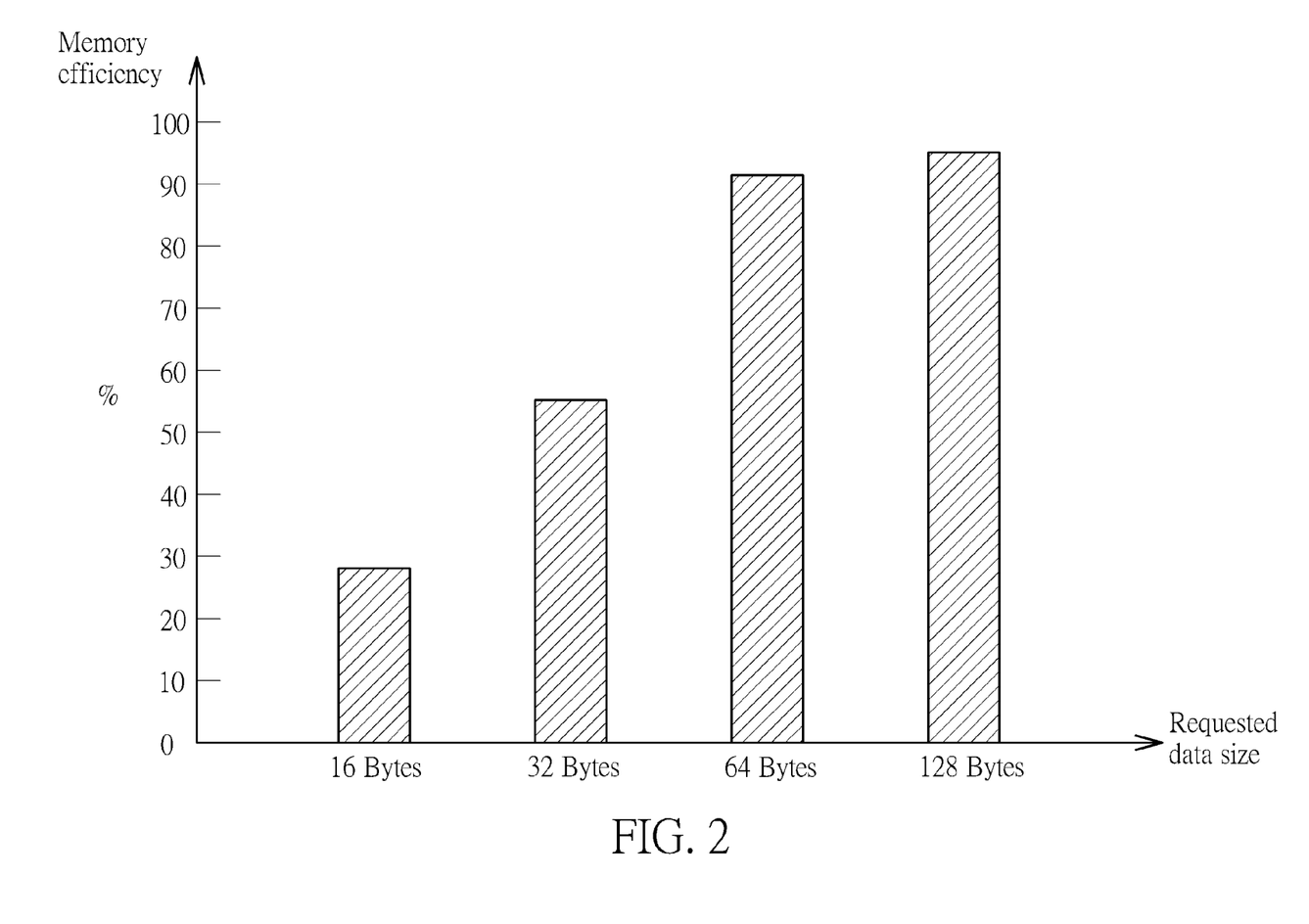
FIG. 2 is a diagram illustrating the relationship between the memory efficiency of the main memory and the requested data size.

As can be seen from FIG. 2, when we compress from 1K bits (128 bytes), the memory efficiency of the data storage device 105 is still high. Besides, compared to the case where a smaller cache line size (i.e., a basic cache line size of the present invention) is employed for buffering a requested RT texture data only, using a larger cache line size for buffering the requested RT texture and its neighboring RT texture data would make the cache system have a lower cache miss rate. If the percentage of the RT texture is higher, the proposed adaptive cache line size design would have a higher miss reduction rate.

It is possible that the tag storage device 114 does not have two address tags (e.g., two adjacent address tags) available to be replaced. Hence, the controller 117 is only allowed to store part of the 1K-bit RT texture data reconstructed by the decompressor 103 (i.e., the 512-bit data chuck requested by the texture unit 102) into the data storage device 112. Specifically, when the checking result indicates that the tag storage device 114 does not have two address tags available to be replaced, the flow proceeds with step 412. In this case, only 512 bits will be replaced based on a set/way associated scheme. In a case where the lower half (Bit[511]-Bit[0]) of the 1K-bit data chunk contains the requested 512-bit RT texture data, the controller 117 only replaces one address tag of an associated 512-bit cache line and drops the higher half (Bit[1023]-Bit[512]) of the 1K-bit data chunk, such that the lower half (Bit[511]-Bit[0]) of the 1K-bit data chunk obtained through the data storage device 105 and the decompressor 103 is stored into the associated 512-bit cache line. In another case where the higher half (Bit[1023]-Bit[512]) of the 1K-bit data chunk contains the requested 512-bit RT texture data, the controller 117 only replaces one address tag of an associated 512-bit cache line and drops the lower half (Bit[511]-Bit[0]) of the 1K-bit data chunk, such that the higher half (Bit[1023]-Bit[512]) of the 1K-bit data chunk obtained through the data storage device 105 and the decompressor 103 is stored into the associated 512-bit cache line. Next, the controller 117 fetches the requested data $DATA_R$ (512 bits) from the associated 512-bit cache line, and returns the requested data $DATA_R$ to the texture unit 102.

In one exemplary design, the first address tags 115 maybe odd address tags (i.e., odd tags), and the second address tags 116 may be even address tags (i.e., even tags), where one even tag and one odd tag form a pair of adjacent address tags arranged in the tag storage device 114. When a specific address bit of the address ADDR of the requested data $DATA_R$ (512 bits) has a first logic value (e.g., "1"), one of the odd address tags 115 is selected and accessed; and when the specific address bit of the address ADDR of the requested data $DATA_R$ (512 bits) has a second logic value (e.g., "0"), one of the even address tags 116 is selected and accessed. In above embodiment, the basic cache line size is 64 bytes (512 bits), and the addressing bit Addr[6] of the address ADDR of the requested data $DATA_R$ can be used to determine whether an odd tag or an even tag should be used.

Figure 5:
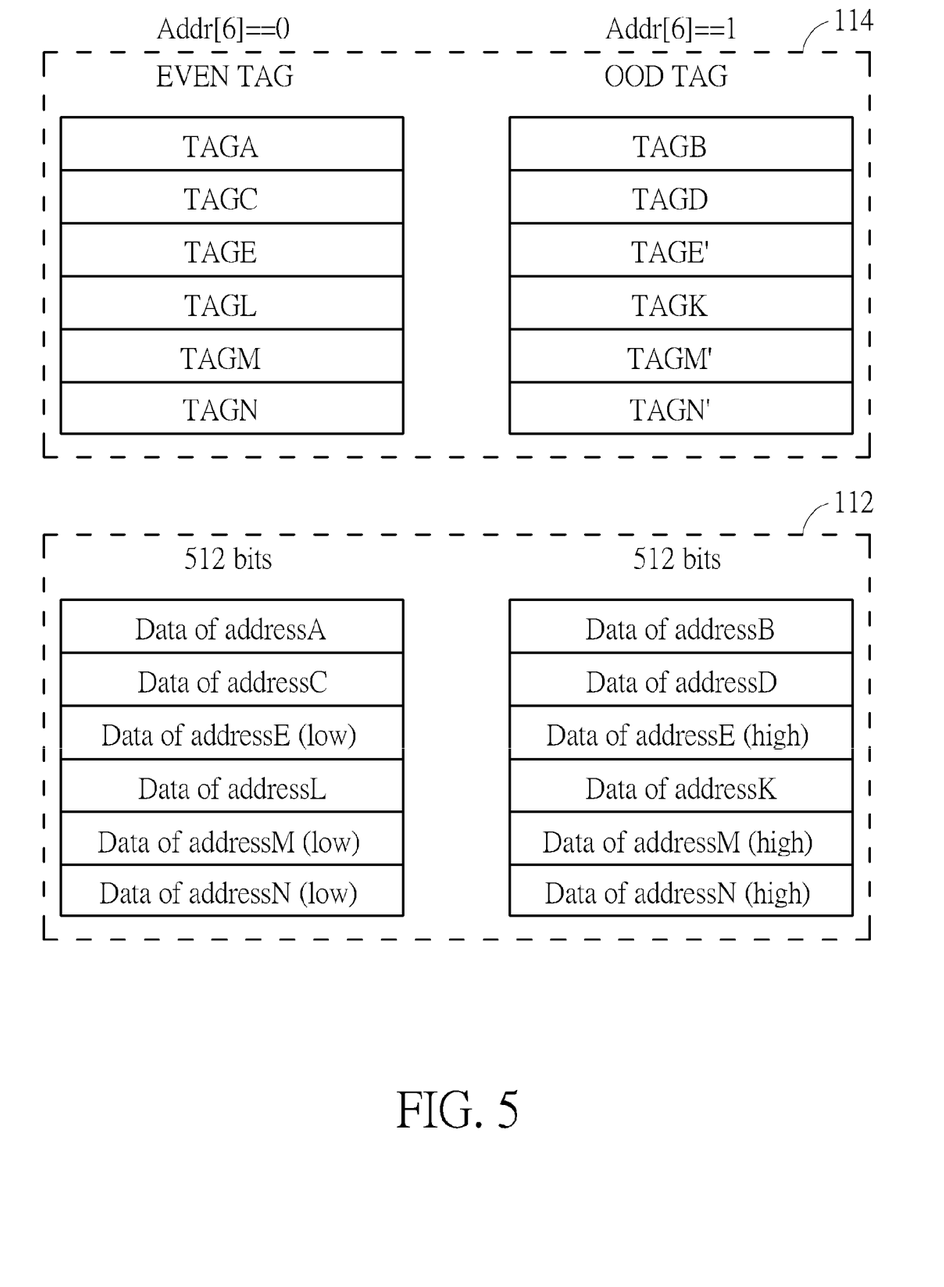
FIG. 5 is a diagram illustrating an example of using the proposed dynamic cache line size design in a cache memory.

FIG. 5 is a diagram illustrating an example of using the proposed dynamic cache line size design in a cache memory. In this embodiment, two address tags replaced in step 410 are required to be adjacent address tags in the tag storage device 114, thus simplifying the design complexity. As shown in FIG. 5, each of the tag values TAGA, TAGC, TAGL is stored into one of the even tags 116 due to Addr[6]==0 (step 406), and each of the tag values TAGB, TAGD, TAGK is stored into one of the odd tags 115 due to Addr[6]==1 (step 406). Besides, a 512-bit cache line associated with each of the odd tags storing the tag values TAGA, TAGB, TAGC, TAGD, TAGL, TAGK is used to buffer a 512-bit data chunk of a non-RT texture.

As shown in FIG. 5, two adjacent address tags, including one odd tag and one even tag, are used to store tag values TAGE and TAGE', respectively (step 410); a 512-bit cache line associated with the even tag storing the tag value TAGE is used to buffer a lower part (Bit[0]-Bit[511]) of the 1K-bit data chunk of an RT texture; and an adjacent 512-bit cache line associated with the odd tag storing the tag value TAGE' is used to buffer an upper part (Bit[512]-Bit[1023]) of the same 1K-bit data chunk. Hence, two adjacent 512-bit cache lines are combined to form a bigger cache line (i.e., a 1K-bit cache line). Similarly, two adjacent address tags, including one odd tag and one even tag, are used to store tag values TAGM and TAGM', respectively (step 410) ; a 512-bit cache line associated with the even tag storing the tag value TAGM is used to buffer a lower part (Bit[0]-Bit[511]) of the 1K-bit data chunk of an RT texture; and an adjacent 512-bit cache line associated with the odd tag storing the tag value TAGM' is used to buffer an upper part (Bit[512]-Bit[1023]) of the same 1K-bit data chunk. Two adjacent address tags, including one odd tag and one even tag, are used to store tag values TAGN and TAGN', respectively (step 410) ; a 512-bit cache line associated with the even tag storing the tag value TAGN is used to buffer a lower part (Bit[0]-Bit[511]) of the 1K-bit data chunk of an RT texture; and an adjacent 512-bit cache line associated with the odd tag storing the tag value TAGN' is used to buffer an upper part (Bit[512]-Bit[1023]) of the same 1K-bit data chunk.

Figure 6:
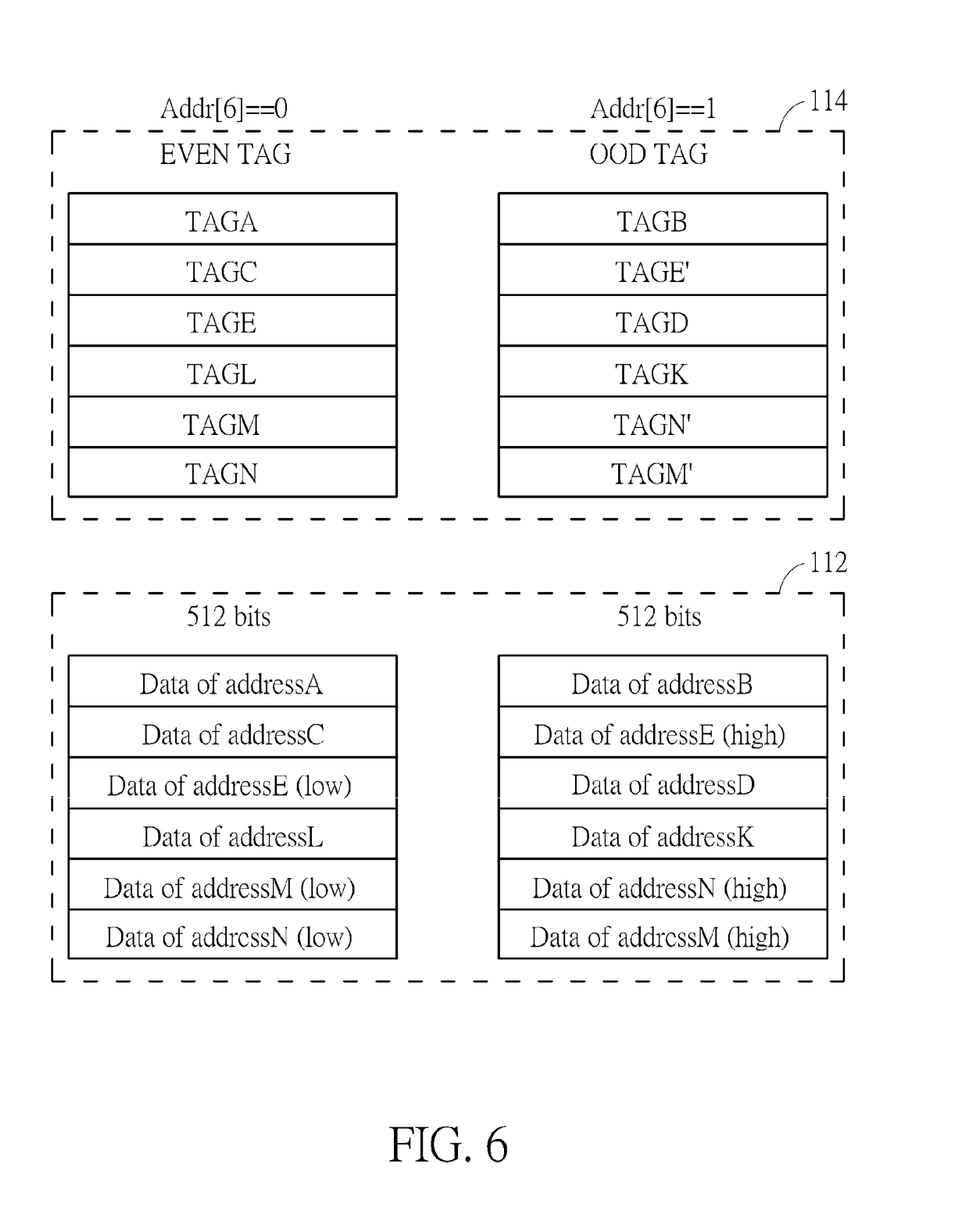
FIG. 6 is a diagram illustrating another example of using the proposed dynamic cache line size design in a cache memory.

FIG. 6 is a diagram illustrating another example of using the proposed dynamic cache line size design in a cache memory. The major difference between the examples shown in FIG. 5 and FIG. 6 is that two address tags replaced in step 410 are not required to be adjacent address tags in the tag storage device 114. As a person skilled in the art can readily understand details of this example shown in FIG. 6 after reading above paragraphs, further description is omitted here for brevity.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A storage system, comprising:
    a data storage device, having a plurality of data storage lines;
    a tag storage device, having a plurality of address tags, each associated with one data storage line allocated in the data storage device; and
    a controller, coupled between the data storage device and the tag storage device, the controller arranged to set at least one first address tag and configure at least one first data storage line to serve as a first data storage line with a first data storage line size, and set at least one second address tag and configure at least one second data storage line to serve as a second data storage line with a second data storage line size, wherein the second data storage line size is different from the first data storage line size, a number of the at least one first address tag is equal to a number of the at least one first data storage line, and a number of the at least one second address tag is equal to a number of the at least one second data storage line.

2. The storage system of claim 1, wherein the first data storage line and the second data storage line coexist in the data storage device.

3. The storage system of claim 1, wherein the number of the at least one first address tag is equal to one, and the number of the at least one second address tag is equal to two.

4. The storage system of claim 1, wherein the second data storage line configured in the data storage device is arranged to store a render target (RT) texture, and the first data storage line configured in the data storage device is arranged to store a non-RT texture.

5. The storage system of claim 4, wherein the second data storage line size is larger than the first data storage line size.

6. The storage system of claim 1, wherein the controller controls the data storage device and the tag storage device to dynamically set a data storage line size.

7. The storage system of claim 1, wherein the number of the at least one second address tag is larger than one, and address tags associated with data storage lines combined to serve as the second data storage line are adjacent address tags in the tag storage device.

8. The storage system of claim 1, wherein the at least one first address tag or the at least one second address tag comprises odd address tags and even address tags; one even address tag and one odd address tag form one pair of adjacent address tags arranged in the tag storage device; when a specific address bit of an address of a requested data has a first logic value, one of the odd address tags is selected and accessed; and when the specific address bit of the address of the requested data has a second logic value, one of the even address tags is selected and accessed.

9. The storage system of claim 1, wherein the number of the at least one second address tag is larger than one; and the controller is further arranged to check whether the tag storage device has the second number of address tags available to be replaced, where the second number of address tags available to be replaced is equal to the number of the at least one second address tag; when a checking result indicates that the tag storage device has the second number of address tags available to be replaced, the controller replaces the second number of address tags available to be replaced; and when the checking result indicates that the tag storage device does not have the second number of address tags available to be replaced, the controller replaces a first number of address tags available to be replaced, where the first number of address tags available to be replaced is equal to the number of the at least one first address tag.

10. A storage system, comprising:
a data storage device;
a tag storage device; and
a controller, coupled between the data storage device and the tag storage device, the controller arranged to set the tag storage device and configure the data storage device to allocate a first data storage line with a first data storage line size for storing a render target (RT) texture, and set the tag storage device and configure the data storage device to allocate a second data storage line with a second data storage line size for storing a non-RT texture, wherein the second data storage line size is different from the first data storage line size.

11. The storage system of claim 10, wherein the first data storage line and the second data storage line coexist in the data storage device.

12. The storage system of claim 10, wherein the first data storage line size is larger than the second data storage line size.

13. The storage system of claim 10, wherein the controller controls the data storage device and the tag storage device to dynamically set a data storage line size.

14. The storage system of claim 10, wherein the data storage device has a plurality of data storage lines; the tag storage device has a plurality of address tags, each associated with one data storage line allocated in the data storage device; multiple data storage lines in the data storage device are combined to serve as the first data storage; and address tags associated with the multiple data storage lines are adjacent address tags in the tag storage device.

15. The storage system of claim 10, wherein the tag storage device comprise odd address tags and even address tags; one even address tag and one odd address tag form one pair of adjacent address tags arranged in the tag storage device; when a specific address bit of an address of a requested data has a first logic value, one of the odd address tags is selected and accessed; and when the specific address bit of the address of the requested data has a second logic value, one of the even address tags is selected and accessed.

16. The storage system of claim 10, wherein when the RT texture is to be stored into the data storage device, the controller is further arranged to check whether the tag storage device has address tags available to be replaced; when a checking result indicates that the tag storage device has the address tags available to be replaced, the controller allocates the first data storage line with the first data storage line size for storing the RT texture; and when the checking result indicates that the tag storage device does not have the address tags available to be replaced, the controller allocates a third data storage line with the second data storage line size for storing the RT texture.

* * * * *